(12) United States Patent
Richards et al.

(10) Patent No.: US 8,976,080 B2
(45) Date of Patent: Mar. 10, 2015

(54) MULTI-SEGMENT IMAGER

(75) Inventors: Martin J. Richards, Redwood City, CA (US); Gerwin Damberg, Vancouver (CA); Gregory John Ward, Berkeley, CA (US); Kenneth Schindler, Alameda, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 261 days.

(21) Appl. No.: 13/597,522

(22) Filed: Aug. 29, 2012

(65) Prior Publication Data

US 2012/0320342 A1    Dec. 20, 2012

Related U.S. Application Data

(63) Continuation-in-part of application No. 13/406,284, filed on Feb. 27, 2012, which is a continuation-in-part of application No. 12/096,341, filed as application No. PCT/CA2006/000542 on Apr. 18, 2006.

(60) Provisional application No. 60/748,125, filed on Dec. 6, 2005.

(51) Int. Cl.
   *G09G 3/00*     (2006.01)
   *G03B 21/13*    (2006.01)
   *G03B 37/04*    (2006.01)
   *H04N 9/31*     (2006.01)

(52) U.S. Cl.
   CPC .............. *G03B 21/13* (2013.01); *G09G 3/002* (2013.01); *G03B 37/04* (2013.01); *H04N 9/3147* (2013.01); *H04N 9/3194* (2013.01)
   USPC ........................................ 345/1.3

(58) Field of Classification Search
   None
   See application file for complete search history.

(56) References Cited

U.S. PATENT DOCUMENTS

| | | | | |
|---|---|---|---|---|
| 3,909,525 A * | 9/1975 | Fagan | ......................... | 348/383 |
| 5,550,656 A | 8/1996 | Sprague | | |
| 5,988,817 A | 11/1999 | Mizushima | | |
| 6,224,216 B1 * | 5/2001 | Parker et al. | ..................... | 353/31 |
| 6,309,072 B1 * | 10/2001 | Deter | .............................. | 353/31 |
| 6,310,650 B1 * | 10/2001 | Johnson et al. | ............... | 348/383 |
| 6,377,295 B1 * | 4/2002 | Woodgate et al. | ............. | 348/59 |
| 6,456,339 B1 * | 9/2002 | Surati et al. | ..................... | 348/745 |
| 6,462,795 B1 | 10/2002 | Clarke | | |
| 6,469,834 B1 | 10/2002 | Shahzad | | |

(Continued)

FOREIGN PATENT DOCUMENTS

| | | |
|---|---|---|
| EP | 1363460 | 11/2003 |
| GB | 2373620 | 8/2002 |

(Continued)

*Primary Examiner* — Antonio Xavier (57) ABSTRACT

Several embodiments of projection systems are disclosed that comprise a plurality of controllable emitters, each said emitter providing light for a light path; a plurality of first optical elements, each said first optical element receiving light from one of said emitters; a controllable modulator receiving light from said plurality of first optical elements; a plurality of conduits, each said conduit disposed over a portion of said controllable modulator; a plurality of second optical elements, each of said second optical elements receiving light from at least one of said plurality of conduits, and a controller for sending control signals to said controllable emitters and said controllable modulator. The illumination from the emitters may form a plurality of overlapping areas of illumination upon a projection screen where the image is intended to be formed.

13 Claims, 10 Drawing Sheets

(56) References Cited

U.S. PATENT DOCUMENTS

| | | | |
|---|---|---|---|
| 6,520,643 B1* | 2/2003 | Holman et al. | 353/20 |
| 6,570,623 B1* | 5/2003 | Li et al. | 348/383 |
| 6,727,864 B1* | 4/2004 | Johnson et al. | 345/1.3 |
| 7,108,400 B2 | 9/2006 | Yamada | |
| 7,292,207 B1* | 11/2007 | Naegle et al. | 345/1.3 |
| 7,334,901 B2 | 2/2008 | Elghoroury | |
| 7,377,652 B2* | 5/2008 | Whitehead et al. | 353/30 |
| 7,417,617 B2* | 8/2008 | Eichenlaub | 345/102 |
| 7,419,267 B2 | 9/2008 | Whitehead | |
| 2002/0041708 A1* | 4/2002 | Pettitt | 382/167 |
| 2002/0057361 A1* | 5/2002 | Mayer, III et al. | 348/383 |
| 2002/0080302 A1* | 6/2002 | Dubin et al. | 349/73 |
| 2003/0206179 A1* | 11/2003 | Deering | 345/589 |
| 2003/0227599 A1* | 12/2003 | Weissman et al. | 353/94 |
| 2005/0134527 A1* | 6/2005 | Ouderkirk et al. | 345/32 |
| 2005/0287449 A1* | 12/2005 | Matthys et al. | 430/30 |
| 2006/0146295 A1* | 7/2006 | Harboe | 353/94 |
| 2006/0250580 A1 | 11/2006 | Cobb | |
| 2007/0091277 A1 | 4/2007 | Damera-Venkata | |
| 2007/0279367 A1* | 12/2007 | Kitai | 345/102 |
| 2008/0013052 A1 | 1/2008 | Van Gorkom | |
| 2008/0205080 A1* | 8/2008 | Erchak et al. | 362/613 |
| 2008/0284677 A1 | 11/2008 | Whitehead | |
| 2009/0021458 A1 | 1/2009 | Drazic | |
| 2010/0002027 A1* | 1/2010 | Krijn et al. | 345/694 |
| 2010/0289836 A1* | 11/2010 | Whitehead et al. | 345/690 |
| 2010/0315323 A1* | 12/2010 | Cennini et al. | 345/102 |
| 2011/0032248 A1* | 2/2011 | Atkins | 345/214 |
| 2011/0216387 A1* | 9/2011 | Whitehead et al. | 359/238 |
| 2011/0228231 A1 | 9/2011 | Schreiber | |
| 2011/0304825 A1 | 12/2011 | Sieler | |
| 2012/0140446 A1* | 6/2012 | Seetzen et al. | 362/97.1 |
| 2012/0212707 A1* | 8/2012 | Richards et al. | 353/30 |
| 2012/0236217 A1* | 9/2012 | Kitai | 349/5 |
| 2012/0320342 A1* | 12/2012 | Richards et al. | 353/30 |

FOREIGN PATENT DOCUMENTS

| | | |
|---|---|---|
| JP | 2008-292736 | 12/2008 |
| WO | 2007/065244 | 6/2007 |

* cited by examiner

MULTI-SEGMENT IMAGER

CROSS-REFERENCE TO RELATED APPLICATIONS

This patent application is a continuation-in-part (CIP) application and claims the benefit of, and priority to, the following applications: (1) co-pending U.S. application Ser. No. 13/406,284 filed on Feb. 27, 2012, which is a CIP application to (2) co-pending application with U.S. patent application Ser. No. 12/096,341 filed on Jun. 5, 2008, which in turn claims the benefit of (3) PCT/CA2006/000542 filed Apr. 18, 2006, which in turn claims the benefit of (4) U.S. Provisional Application No. 60/748,125, filed on Dec. 6, 2005. The disclosure made in the application Ser. Nos. 13/406,284, 12/096, 341, PCT/CA2006/000542 and 60/748,125 are hereby incorporated by reference in their entirety.

TECHNICAL FIELD

The present invention relates to imaging systems and, more particularly, to imaging system comprising a plurality of imaging segments.

BACKGROUND

In the field of large displays systems and/or large projector systems, it is known to partition the emitters and to provide a plurality of optical paths to form a coherent image upon a display or a projector screen. Such system may be found variously described in: (1) co-owned United States Patent Application Publication Number 20080284677 ("the '677 application") entitled "MODULAR ELECTRONIC DISPLAYS"; (2) U.S. Pat. No. 7,334,901 entitled "LOW PROFILE, LARGE SCREEN DISPLAY USING A REAR PROJECTION ARRAY SYSTEM"; (3) U.S. Pat. No. 5,988,817A entitled "MULTIPROJECTION SYSTEM"; (4) U.S. Pat. No. 6,309,072B1 entitled "VIDEO PROJECTION SYSTEM FOR PROJECTING MORE THAN ONE PICTURE"; (5) United States Patent Application Publication Number 20070091277A1 entitled "LUMINANCE BASED MULTIPLE PROJECTOR SYSTEM"; (6) U.S. Pat. No. 7,108, 400B2 entitled "LIGHT SOURCE UNIT AND PROJECTOR"—each of which is hereby incorporated by reference in their entirety.

SUMMARY

Several embodiments of display systems and methods of their manufacture and use are herein disclosed.

In one embodiment, a projection system comprises a one or more segments of emitters, optics and modulators that illuminate a projection screen in a set of overlapping images.

In several embodiments, projection systems are disclosed that comprise a plurality of controllable emitters, each said emitter providing light for a light path; a plurality of first optical elements, each said first optical element receiving light from one of said emitters; one or more controllable modulators receiving light from said plurality of first optical elements; a plurality of conduits, each said conduit disposed over a portion of said controllable modulator; a plurality of second optical elements, each of said second optical elements receiving light from at least one of said plurality of conduits; a controller, said controller sending control signals to said controllable emitters and said controllable modulator, said control signals applied according to image data to be rendered upon a screen by projected light from said plurality of second optical elements. The illumination of from the emitters may form a plurality of overlapping areas of illumination upon a projection screen where the image is intended to be formed.

In yet another embodiment, a projection system may comprise a plurality of controllable emitters, each said emitter providing light for a light path; a plurality of first optical elements, each said first optical element receiving light from one of said emitters; an array of controllable modulators, each controllable modulator receiving light from said plurality of first optical elements; a plurality of conduits, each said conduit disposed over a portion of said array of controllable modulators; a plurality of second optical elements, each of said second optical elements receiving light from at least one of said plurality of conduits; and a controller, said controller sending control signals to said controllable emitters and said controllable modulator, said control signals applied according to image data to be rendered upon a projection screen by projected light from said plurality of second optical elements; and further wherein light transmitted by said array of controllable modulators is transmitted in a fanning direction and affects a plurality of overlapping areas of illumination upon said projection screen.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In conventional movie projector systems, despite their longevity in use in the industry, there are areas that may be improved upon. First, their concentrated light sources are typically lossy, single-points of failure. Secondly, their conventional optics may tend to scatter light through a single lens/optical path, particularly when contaminants like oil or dust may collect on the single lens/optical path.

Introduction to Modular Display/Projector Systems

Now, in continued reference to the co-owned '677 application, modular projector systems are disclosed that comprise arrays of modules that include light sources and light modulators. The modules also may include control circuits that perform some image processing functions. The modules may illuminate a screen directly or may include optical systems that project light onto a screen.

Figure 1:
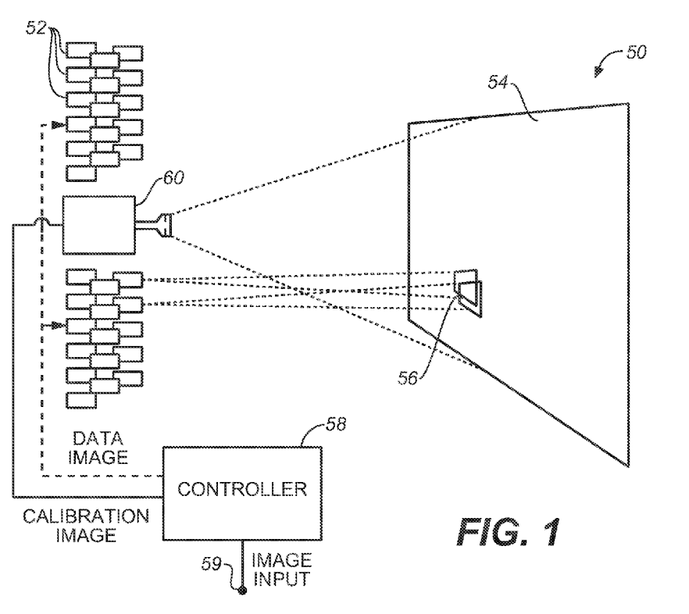
FIG. 1 shows one embodiment of an image projection system comprising a number of modules further comprising an emitter and a modulator.
Figure 2:
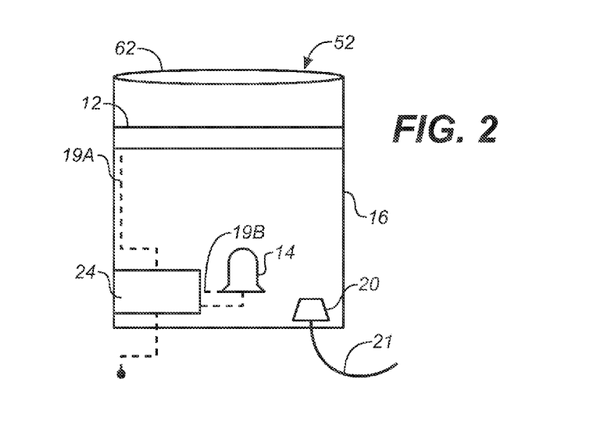
FIG. 2 shows one embodiment of a module as utilized in the image projection system of FIG. 1.

FIG. 1 (which is FIG. 4 in the '677 application) shows an image projection system 50 in which a plurality of modules 52 are used to provide a projection-type display. As shown in FIG. 2 (which is FIG. 5 in the '677 application), modules 52 may be similar in construction to any of modules in the '677 application with the addition, in some embodiments, of a projection optical system 62 that projects an image of modulator 12 onto screen 54. Optical system 62 may comprise any suitable arrangement of lenses, mirrors, and/or other optical elements. In some cases an optical system 62 may direct light at an angle to the optical axis of module 52. For example, an optical system 62 may deflect light from a centrally-located module 52 to illuminate an area 56 in a corner of screen 54. In some embodiments each module 52 has its own optical system 62.

In some cases where screen 54 is far enough away from modules 52 it may be unnecessary to provide an optical system 62 on the outer side (i.e. the screen side) of modulator 12 as the light sources of modules 52 may produce light that is well-enough collimated to image the modulator 12 onto screen 54 without focusing on the screen side of modulator.

Each module 52 projects onto a corresponding area 56 of screen 54. System 50 includes enough modules 52 so that the entire area of screen 54 is covered by areas 56 corresponding to the modules 52. Typically at least most of modules 52 have corresponding areas 56 that are much smaller than screen 54. For clarity, FIG. 1 shows only two areas 56. Every spot on screen 54 preferably lies within two or more areas 56. Most preferably, every spot on screen 54 lies within 4 or 5 more areas 56. In currently preferred embodiments of the invention, each point on at least a main viewing area of screen 54 lies within 5 to 15 areas 56. It is not necessary that there be the same number of overlapping areas 56 at every point on screen 56.

Modules 52 may be mounted rigidly so that the locations and orientations of the corresponding areas 56 do not move on screen 54. Modules 52 may be mounted on one or more backplanes, or modules 52 may be mounted in some other manner. For example, modules 52 may be mounted individually or in bundles. Modules 52 may be arranged in one or multiple banks of modules or may be distributed individually. System 50 may include a large number of modules 52. For example, some embodiments of system 50 include 1000 to 15,000 modules 52. As will be discussed below (and in reference to other embodiment shown in later Figures), other embodiments may use much less modules, as the efficiency and luminance of emitters improve over time.

Modules 52 may be located in any suitable locations including the ceiling of a theater or other room. Modules 52 may optionally be thermally coupled to air conditioning or other air ducts to help to maintain modules 52 within a desired operating temperature range.

Signals and electrical power may be provided to modules 52 in any suitable manner. A single video and power cable or data bus may extend to all modules 52. In the alternative, separate power and video cables may connect to different modules 52 or different groups of modules 52. Modules 52 may receive signals by way of wires, optical fibers, or wireless communication methods. Communication of signals to modules 52 may be simplified because the same data may be provided to all of modules 52 (or, in some embodiments, all modules 52 of each color).

A controller 58 provides image data to modules 52. Each module 52 emits a pattern of light according to the image data. The image data is, or is based on, data received at an image input 59. With modules as illustrated in FIG. 2, the pattern of light is determined by the intensity at which light source 14 is operated as modulated, on a pixel-by-pixel basis by modulator 12.

It is possible, but not necessary, to carefully align modules 52. The orientations and locations of the areas 56 corresponding to the different modules 52 may be essentially random as long as every point on the viewing area of screen 54 is covered with an appropriate number of overlapping areas 56. Areas 56 are not necessarily all the same shape or size. Areas 56 are not necessarily squares, rectangles or other regular shapes. For example, in some embodiments, areas 56 may be trapezoidal or elliptical, partly or entirely as a result of the angles at which the corresponding modules 52 are directed at screen 54.

Areas 56 are not necessarily the same size. Different modules 52 may have projection optics which causes the modules to cover differently-sized areas 56. For example, some modules 52 may have wide-angle lenses which cause the corresponding areas 56 to be large, possibly, in some cases, covering a significant fraction of the entire screen 54 or even the entire screen 54. Other modules 52 may have optics that causes the corresponding areas 56 to be quite small.

Arranging modules 52 so that areas 56 are not arranged in a regular pattern avoids the creation of visible seams in the overall image. It also makes it much easier to install and align modules 52.

FIG. 2 is a schematic view of a module 52. Module 52 has a modulator 12 illuminated by a light source 14. Modulator 12 may comprise a transmission-type modulator, such as a liquid crystal display ("LCD") panel or the like. In some embodiments, each modulator 12 comprises a 2-dimensional array of independently-controllable pixels.

Light source 14 preferably comprises a solid-state light source such as a light-emitting diode ("LED"). However, other types of light sources may be used in the alternative. In some embodiments, light sources 14 have variable light outputs.

Module 52 has a housing 16 that supports modulator 12 and light source 14. Housing 16 may comprise mounting points such as mounting tabs, clips, or the like which allow housing 16 to be mounted to a suitable backplane. The backplane may be planar but this is not mandatory.

Controller 24 may receive signal and power from external sources (not shown). Within module 52, a signal 19A may drive modulator 12 and a signal 19B may drive light source 14. Signals 19A and 19B may be received through controller 24 or may be generated in module 52 from other signals received by way of controller 24.

A light sensor 20 may optionally be provided for calibrating the light output of a module 52. In some applications this may be desirable because of variations in light sources 14 or the components that control light sources 14. For example, due to manufacturing process variations, different LEDs of the same type may provide different light output even when driven by the same current.

In some embodiments, light sensors 20 may comprise the ends of optical fibers 21 that carry light to a common sensor. Providing a central sensor for calibration purposes may avoid having the accuracy of calibration affected by differences between individual sensors or temperature differences between different modules 52. In other embodiments, separate light sensors are provided for each module 52. In some cases, the outputs of light sources 14 may be sufficiently predictable that it is not necessary to provide a light sensor 20.

In some embodiments, the brightness of light source 14 may be controlled over a reasonable range. For example, light source 14 may be driven by an 8-bit driver that provides 256 brightness levels.

To achieve a bright image on screen 54, it may be desirable that modules 52 be optically efficient. One way to make modules 52 optically efficient is to make modulator 12 a monochrome modulator. The color of the light emitted by the module 52 may be determined primarily by the color of light source 14 or, alternatively, by a color filter. In embodiments that employ monochrome modules, system 50 may include modules 52 having light sources that emit different colors of light. For example, some modules 52 may have sources of red light, others may have sources of green light and others may have sources of blue light. In such embodiments, it is desirable that areas 56 corresponding to two or more, and possibly three or more modules 52 of each color should overlap at each point in the viewing area of screen 54. A system 50 may include modules 52 of three or more colors chosen to provide a suitable color gamut for the images to be displayed.

The optical efficiency of a module 52 may be further increased by making modulator 12 have a relatively low resolution. Lower-resolution modulators tend to have higher fill factors than higher-resolution modulators. This typically results in higher overall optical efficiency. For example, modulators 12 may have a resolution of a few-dozen to a few hundred pixels in each direction. For example, in some embodiments, light modulators 12 have fewer than 500 pixels in at least one direction. In some embodiments, light modulators 12 have fewer than 220 pixels. In one embodiment, modulators 12 have resolutions of 320 by 240 pixels.

Where modulator 12 may pass light of a particular polarization state, light source 14 may be selected and arranged to emit light in the polarization state that is preferentially passed by modulator 12. For example, where modulator 12 is an LCD that passes light that is linearly polarized in a certain direction, light source 14 may be an LED that emits polarized light and the LED may be aligned so that the polarization of the emitted light is aligned with the polarization direction of the LCD.

In cases where each module 12 generates light of one color, it is possible to operate each module 12 at a reduced refresh rate in comparison to systems that use one modulator to time-multiplex several colors.

System 50 may also include a camera 60 located to take images of screen 54. Camera 60 may be used in various ways. Camera 60 is a high-resolution camera. A primary use for camera 60 is for calibrating system 50. Since camera 60 is required only for calibration purposes, camera 60 does not need to be present except during calibration of a system 50.

In systems having an overall structure similar to that of FIG. 2, color may be provided in any of various different ways. These include providing monochrome modules of at least two and, in most cases three or more different colors or providing modules that each project a color image. Where modules each project a color image, the color image may be obtained in various ways including: providing a color modulator in each module or providing a monochrome modulator operating in a field sequential mode wherein a color of light incident on the modulator is changed for each of a series of fields. The color of light incident on the modulator may be varied by interposing different filters in the light path or by turning on light sources of different colors. For example, each module could include red, green and blue LEDs driven in a field-sequential mode to illuminate a monochrome LCD light modulator. The LEDs may be operated cyclically to issue R, G and B light at a relatively high frequency. The LCD may be operated in synchronization with the cycling of the light sources to present images to be displayed in red, green and blue respectively.

Additional Embodiments of Multi-Segment Displays/Projectors

In continued reference to FIGS. 3, 4 and 5, many additional embodiments of multi-segment imaging systems, displays and/or projectors will now be described.

Figure 3:
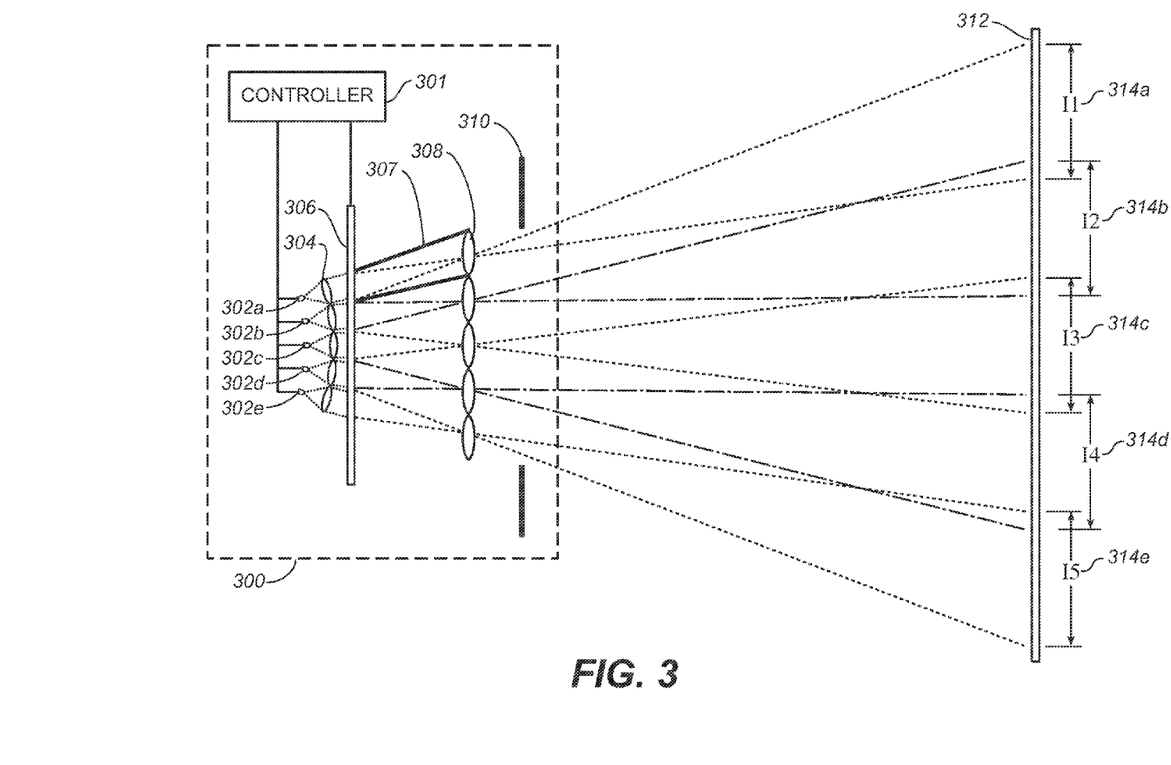
FIG. 3 depicts one embodiment of the multi-segment imager as made in accordance with the principles of the present invention.

FIG. 3 depicts one embodiment of a multi-segment imaging system 300. Imaging system 300 comprises an array of emitters 302a-e (e.g. high power LEDs, OLEDS, quantum dots or any other suitable emitters)—wherein each emitter 302 provides light into a first optical element 304. First optical element 304 (shown schematically) may comprise one, two or more optical elements—e.g., a collimating lens and/or condenser or other lenses (e.g. 50 mm focal length) and/or a polarizing re-capture element, as discussed further herein. This light illuminates at least a portion of a modulator 306. In one embodiment, modulator 306 may comprise any suitable light modulator, including an LCD panel and a plurality of its subpixels (which may be either colored or monochrome or a combination thereof). In another embodiment, modulator 306 may comprise a plurality of individually controlled modulators, such as LCDs, DLP (Digital Light Processing) integrated circuits or other Micro-Electro-Mechanical devices (MEMs). In general, embodiments support any relation between optical elements (304) and modulators (306) (e.g., 1:1 or N:1). Emitters 302 may optionally be locally dimmed according to control signals produced from controller 301. In addition, modulator 306 may be controlled by controller 301 in accordance to image data that is intended to be rendered upon projection screen 312. In one embodiment, modulator 306 may comprise a LCD screen. The resolution of the LCD screen may vary according to performance requirements of the system—e.g., 1680 by 1050 resolution may suffice in one embodiment; but other resolutions may also suffice. In another embodiment, modulator 306 may comprise an array of digital micromirror devices (DMDs), such as those provided by Texas Instruments (e.g., the DLP® DLP5500, part of the 0.55 XGA Series 450 DMD), wherein each DLP IC provides a 1024×768 pixel resolution.

Once the light has been modulated and transmitted through modulator 306, the light may illuminate a set of projector lenses 308. In one embodiment, the light transmitted from the LCDs or MEMs may be further transmitted through a set of conduits and/or baffles (with one such baffle 307 shown in FIG. 3) to mitigate any undesirable optical cross-talk. In some embodiments, e.g., when modulator 306 comprises an array of modulators, there could be multiple elements (304) per projection lens (308). Further along the light path, the light may be directed to pass through port 310. Once the light is projected beyond port 310, the light—depending upon the overlap due to the direction of each of the light paths from the emitters—illuminates a screen 312 at a distance away from system 300.

As may be seen in FIG. 3, the light paths of the emitters 302a-e may be directed to fan outward—i.e., where the emitters at either end of the array of emitters illuminates the edges of the screen in overlapping fields 314a-e, as shown.

Figure 4:
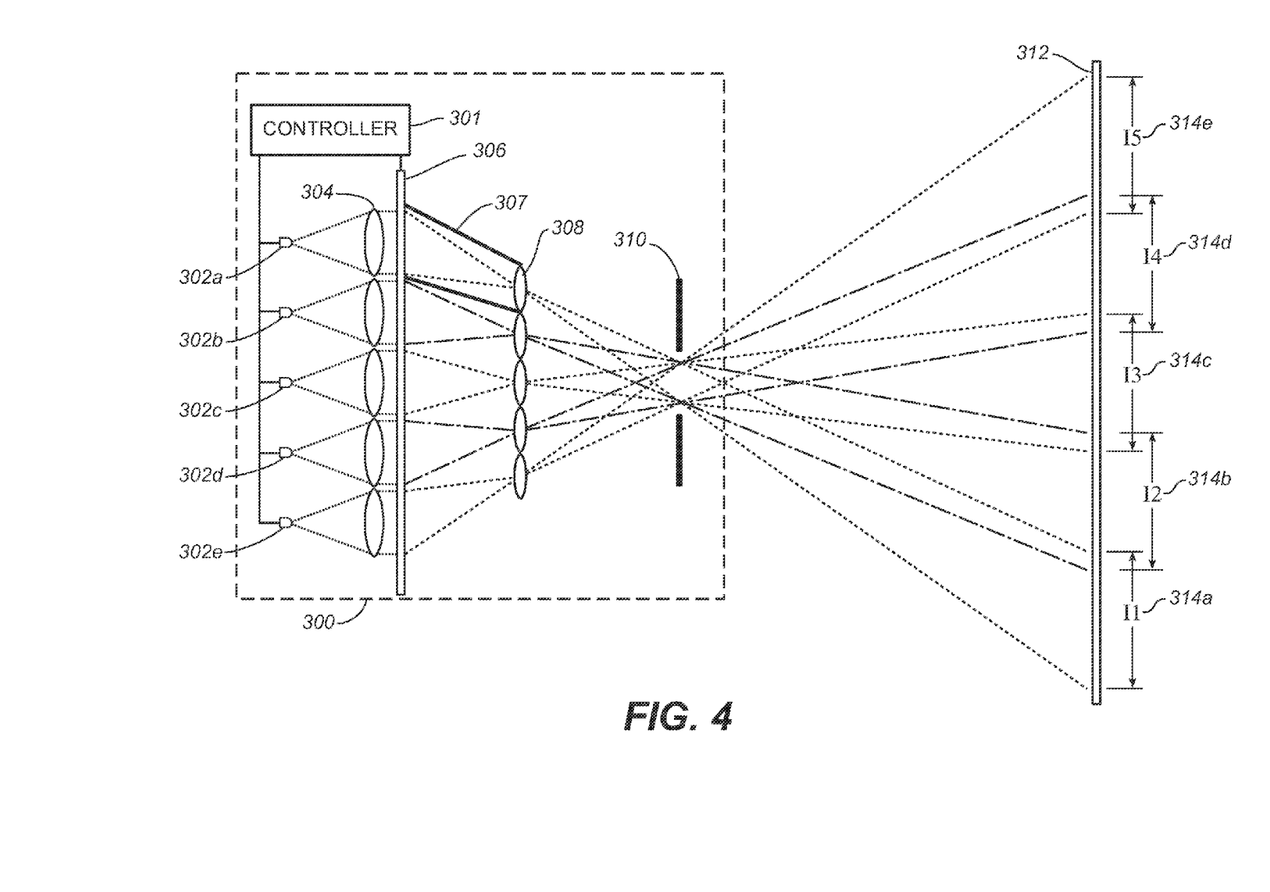
FIG. 4 depicts another embodiment of the multi-segment imager as made in accordance with the principles of the present invention.

FIG. 4 is another embodiment of a multi-segment imaging system 300. In this embodiment, the emitters are aligned so that the light paths of the emitters 302a-e produce overlapping fields 314e-a, as shown in a fanning inwards fashion. Fanning the illumination in a given direction (e.g., inward or outward) may be accomplished in a variety of ways—e.g. positioning the modulators in a fanning direction or otherwise directing the light path by use of optical elements in a fanning direction. It will be appreciated that, while the projection screen may be a flat surface, the projection screen may also have some curvature. As described in FIG. 3, modulator (306) may also comprise an array of individually controlled modulators (such as LCDs, DLP chips or other MEMs devices). Furthermore, there could be multiple elements (304) per projection lens (308).

Figure 3A:
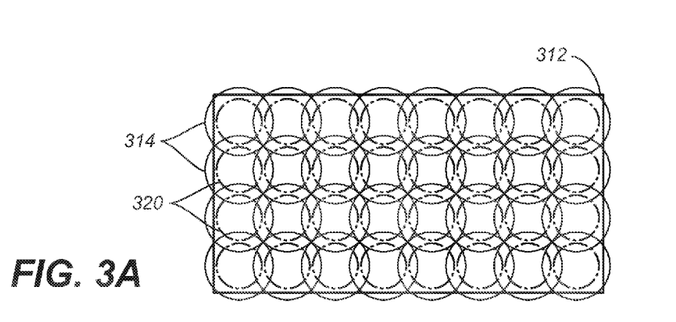
FIG. 3A depicts one possible overlapping pattern of illumination that may be produced from imaging systems in the present applications.

FIG. 3A depicts how light from this plurality of light paths—emanating from its associated projector lens—may converge and overlap upon a projection screen 312. In the embodiment of FIG. 3, the image area 314 may spread out from the projected lens (whose area 320 is shown in dashed line form for comparison) and overlap with optically adjacent segments. It should be appreciated that, while the illumination pattern is shown as substantially circular regions in a rectangular array pattern, many other patterns are of course possible and suffice for the purposes of the present application. For example, instead of circular areas of illumination, the areas of illumination may be substantially rectangular, or any other suitable areas. In addition, instead of a substantially rectangular array pattern, the areas of illumination may form a substantially hexagonal pattern of overlapping illumination areas, or any other suitable pattern.

This embodiment may comprise one or more black and white (or color) LCD panels—together with an array of illumination optics and an array of projection optics to project overlapping images onto a screen in a cinema. In one embodiment, each panel may comprise a plurality of such optical systems. For merely expository reasons, each panel may comprise around 50-100 illumination and projection optic systems. Each illumination optics system may further comprise a high power LED (such as that used in LED projectors) that can be modulated, and optics to focus the light through the LCD panel and into the projection optics. The illumination optics may also contain polarization recycling optical elements.

Following the example above, each projection optics system may comprise a projection lens capable of focusing the sub-segment of the LCD onto the screen such that approximately 1/50-1/100 of the screen is covered. In embodiments affecting a low resolution image, expensive lenses may not be required. The 50-100 sub-segment images may then be projected onto the screen such that they produce overlapping images with 50-100 spatially separated images on the screen. When projecting an image, the LEDs may be modulated in a dual modulated fashion, and the image on the LCD is adjusted as appropriate for the LED level. The image on the LCD is a series of sub-segments of the desired image—such that, when projected with the multiple optics, the image on the projection screen produces the desired image.

In order to determine the image needed on the LCD panel, calibration with a high resolution image may be desired. Algorithms to determine the scaling, trapezoidal correction, levels, etc. may be used from the camera images to determine the image needed on the LCD panel. The LCD panels may be dual modulation panels, e.g. two black and white panels in series. Color panels may also suffice.

Alternative Embodiments of Single Segments

In continued reference to FIGS. 5A, 5B, 6, 7 and 8, a variety of embodiments of portions and/or segments of the imaging system are shown—in which such portions comprise a portion of a light path from a single or small number of emitters.

Figure 5A:
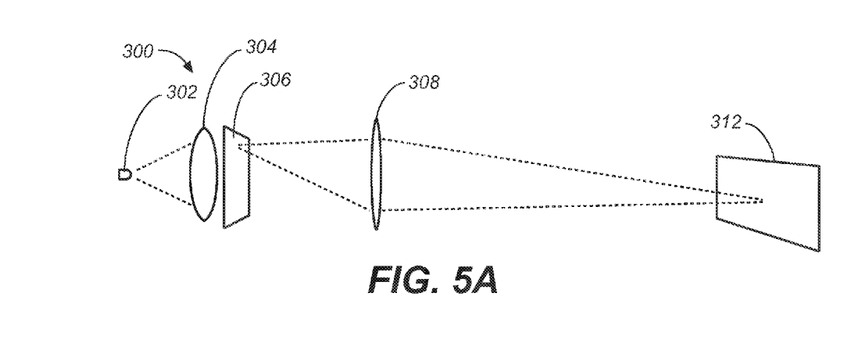
FIG. 5A shows one embodiment of a single segment and/or light path of a single emitter in an imaging system comprising one modulator in the light path of the present invention.
Figure 5B:
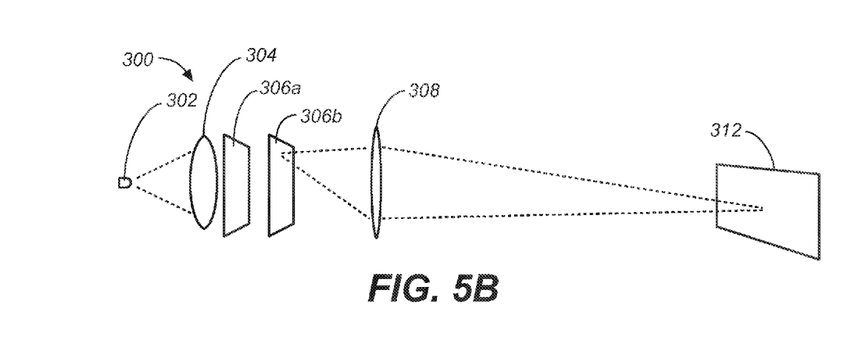
FIG. 5B shows one embodiment of a single segment and/or light path of a single emitter in an imaging system comprising multiple modulators in the light path of the present invention.

FIGS. 5A and 5B are embodiments of a segment of a multi-segment imaging system—in particular, showing the light path of a single emitter 302. As discussed, light from emitter 302 transmits through optical element 304 (which may comprise of one or more optical lens or other elements). Light transmitted through optical element 304 illuminates a first modulator 306 (e.g. LCD panel or the like), in the case of FIG. 5A. In the case of FIG. 5B, a first modulator 306a may illuminate a second modulator 306b (e.g. LCD panel or the like). The second modulator may be used to project images of increased dynamic range of the images projected. The use of two or more modulators for increasing the dynamic range of projected images is disclosed in co-owned United States Patent Application Publication Number 20080043303 entitled "HDR DISPLAYS WITH OVERLAPPING DUAL MODULATION"—which is herein incorporated by reference in its entirety.

Once the desired modulation of the light is affected by one or more modulators, the light may illuminate a projector lens 308—and thereafter, illuminate a portion of a projection screen 312. In the case of FIG. 5B, the projection lens 308 is more focused upon the modulator 306b than it is on the modulator 306a, which may be slightly defocused. Such defocused modulation may of course be anticipated for and controlled by the signals given to the controllable elements (e.g., emitters and modulators) in the software control. As it is the projection lens that maps the light from modulator 306b to the projection screen 312, optical element 304 need not focus on either modulator—but through the modulators to the projection lens for maximum efficiency.

Figure 6:
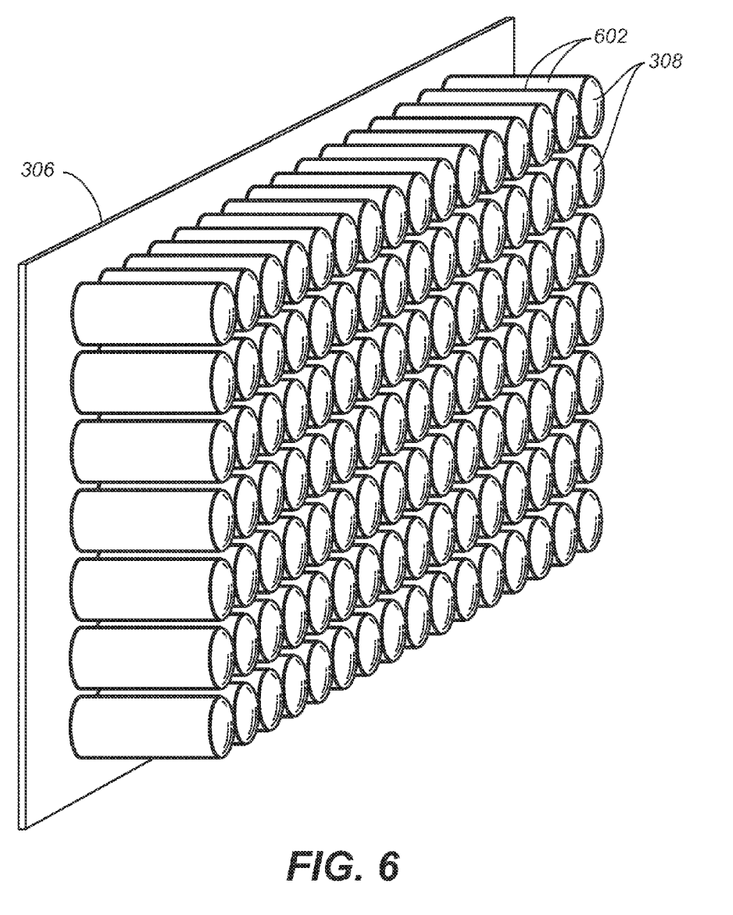
FIG. 6 shows an embodiment of an array of conduits conducting light from a modulator to an array of projection lens.

FIG. 6 shows an embodiment of an array of conduits conducting light from a modulator to an array of projection lens. As shown, the light emanating from modulator 306 may be illuminate conduits 602. Conduits 602 may be light baffles or other light containment element—e.g., to help prevent light cross-talk between light that has been modulated to a desired amount. At the end of conduit 602, projector lenses 308 may be positioned to provide a desired amount of light adjustment, prior to the light being projected to the screen.

Figure 7:
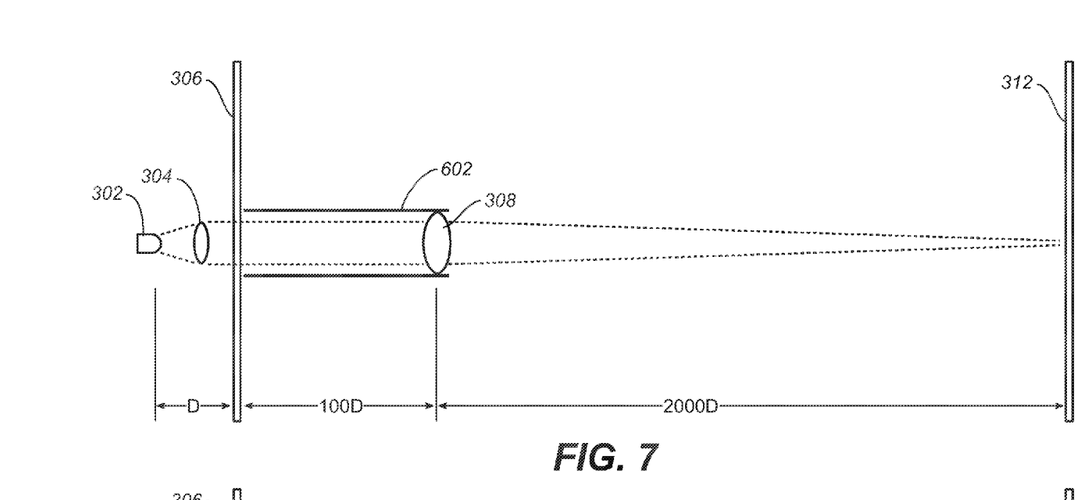
FIGS. 7 and 8 show a plurality of embodiments of the light path through a single conduit comprising a single emitter and a plurality of emitters, respectively.

FIG. 7 shows one embodiment of a segment of an imaging system in which emitter 302 illuminates first optical element 304 and sits back a distance D (e.g., D=4 inches) from modulator 306. Light from modulator 306 is transmitted through conduit 602 to projector lens 308 at a distance approximately 100×D from the modulator. Thereafter, light propagates from projector lens 308 to screen 312 at a distance approximately 2000×D.

Figure 8:
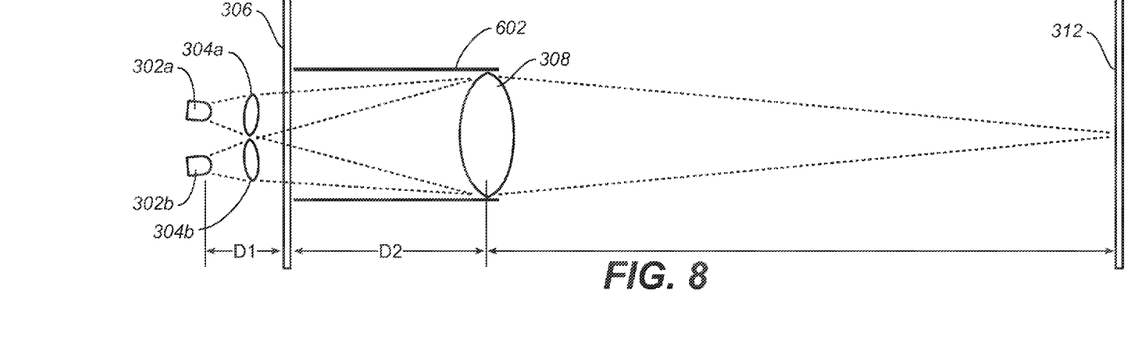

FIG. 8 shows another embodiment of a segment of an imaging system, similar to FIG. 7—but that conduit 602 and lens 308 may input light from two (or more) emitters 302a,b that is transmitted through first optical elements 304a,b respectively. In this embodiment, emitters 302a,b may be placed further back from modulator 306 than in the embodiment of FIG. 7. In another embodiment (not shown), modulator 306 may comprise an array of modulators, such as LCDs, DLP chips or other MEMs devices.

Embodiments of Segment Arrays

In continued reference to FIGS. 9, 10, 11 and 12, various embodiments of imaging systems as made in accordance with the principles of the present application will now be described.

Figure 9:
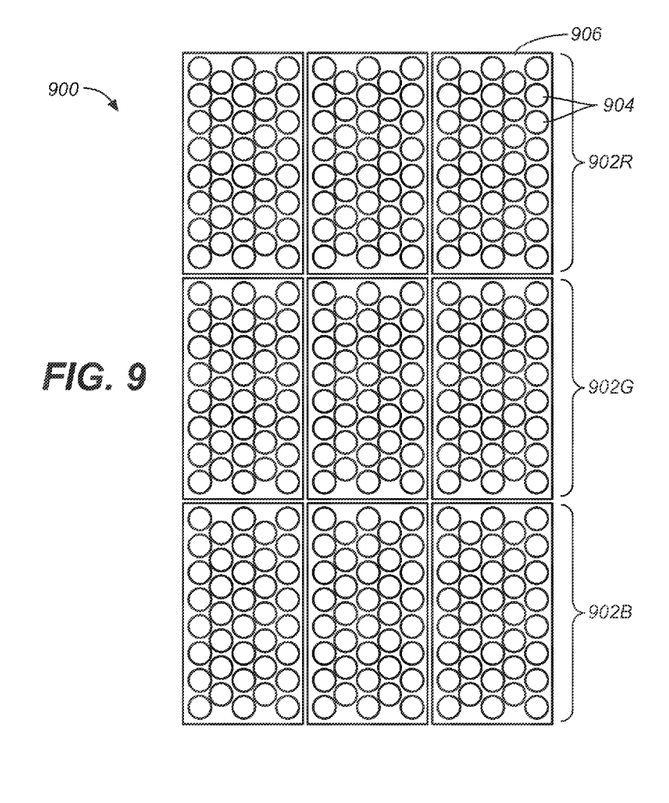
FIG. 9 depicts one embodiment of an array of modulator panels illuminated by a set of emitters.

FIG. 9 depicts one embodiment comprising an array (here, a 3×3) of modulator panels 906. Each modulator panel 906 receives the light from an array of emitters 904. As shown in this example, one modulator panel 906 may receive up to 38 emitters 904. Additionally as shown, each row may comprise a single color of emitted lights—e.g., row 902R may emit red color light from single red emitters (row 902G green color and row 902B blue color, respectively). Thus, in this example, the system may comprise 114 emitters per color (i.e. 38×3); and 342 lens segments (38×9).

Figure 10:
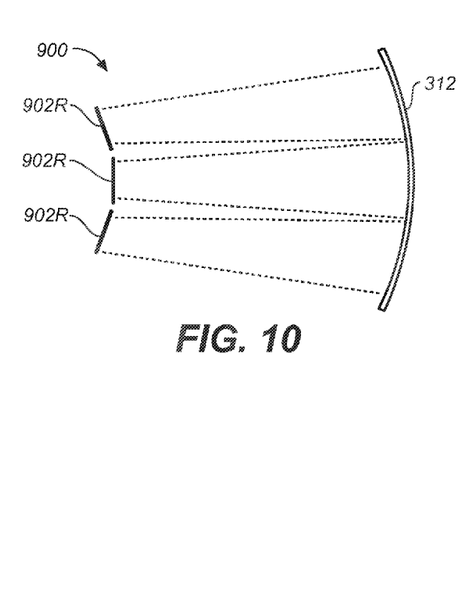
FIG. 10 shows one embodiment of the display system made in the manner of FIG. 9 illuminating a projecting screen.

FIG. 10 depicts one embodiment of an imaging system in which the panels of FIG. 9 illuminate a projector screen 312. As shown, FIG. 10 is a top view of one portion of FIG. 9 (and more precisely, the red portion of the system and its illumination pattern). The three panels 902R are shown as fanning out and projecting the red color for image illumination to the screen 312. The other colors (e.g., green and blue) panels may also be constructed and arrayed similarly.

It should be noted that the screen 312 may be designed as either a curved surface (as shown in FIG. 10) or a flat surface (as shown in FIG. 1). It should also be appreciated that the imaging system may employ any other suitable primary colors as desired. It may suffice that the primaries chosen may provide a suitable color gamut for the images intended to be rendered. It will be appreciated that other array sizes (other than 3×3) and number of emitters per panel may also suffice for the purposes of the present invention. It may be desirable to include as many panels and emitters as may be desired to provide suitable luminosity for the images intended to be rendered.

Figure 11A:
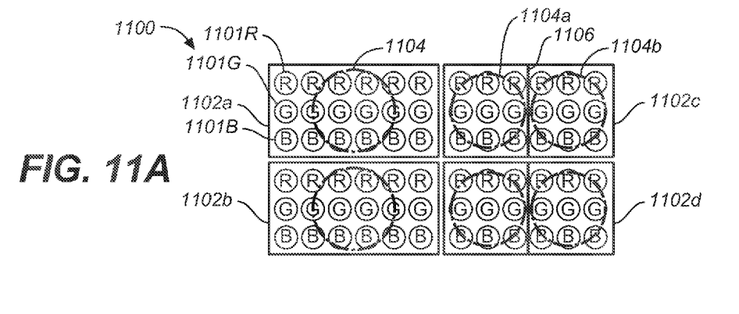
FIG. 11A shows another embodiment of an array of modulator panels illuminated by a set of emitters.
Figure 11B:
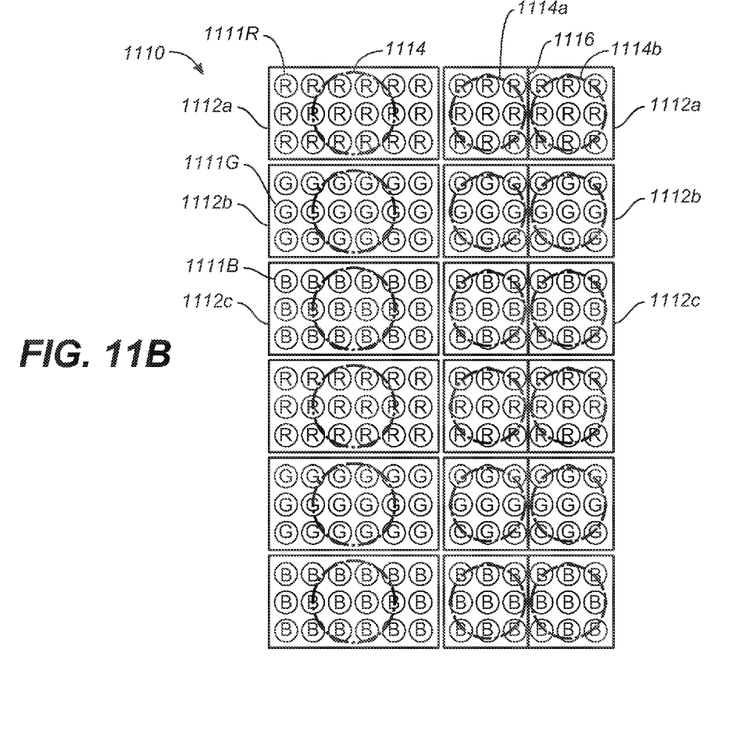
FIG. 11B shows yet another embodiment of an array of modulator panels illuminated by a set of emitters.

FIGS. 11A and 11B depict two other embodiment comprising an array of modulator panels. FIG. 11A shows a 2×2 array 1100 of modulator panels 1102a, 1102b, 1102c and 1102d. Each modulator panel 1102 receives the light from an array of emitters (e.g., 1101R, 1101G, 1101B). In this embodiment, each panel 1102 may receive light from a plurality of different color emitters (e.g., red, green and blue, as depicted here). Each of these modulator panels may provide light to one projector lens (shown here as 1104) or perhaps two or more projector lenses (as shown here as 1104a and 1104b). FIG. 11B shows an array 1110 of modulator panels 1112a, 1112b and 1112c in a first 2×3 array (which may or may not be repeated, as shown). In this case, each modulator panel may be illuminated by a set of emitters (e.g., 1111R, 1111G and 1111B—which may provide a single color of illumination for each modulator panel, as shown and if desired). Each modulator panel may provide light to one projector lens 1114 or two or more projector lenses (e.g. 1114a and 1114b, as desired). Where there is a possibility of undesirable cross-talk, baffles or conduits 1106 and 1116 may be provided to mitigate or abate such cross-talk.

Figure 12:
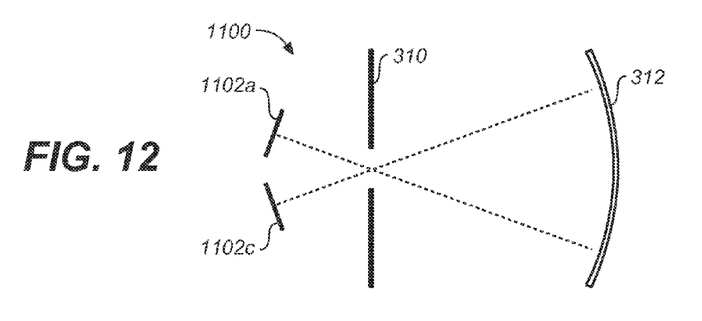
FIG. 12 shows one embodiment of the display system made in the manner of FIG. 11 illuminating a projecting screen.

FIG. 12 depicts one embodiment, in a schematic fashion, as to how the light from these panels may be aligned and/or constructed to provide illumination for a projector screen 312. For example, looking as a top view, panels (for one example, 1102a and 1102c) may be arrayed to cross-illuminate (e.g. fanning inward) the screen (through port 310), as depicted in FIG. 4. As with FIGS. 9 and 10 above, the embodiments of FIGS. 11A, 11B and 12 may be designed with a different number of panels, different arrays of colored emitters, and even different colored emitters themselves.

Figure 14A:
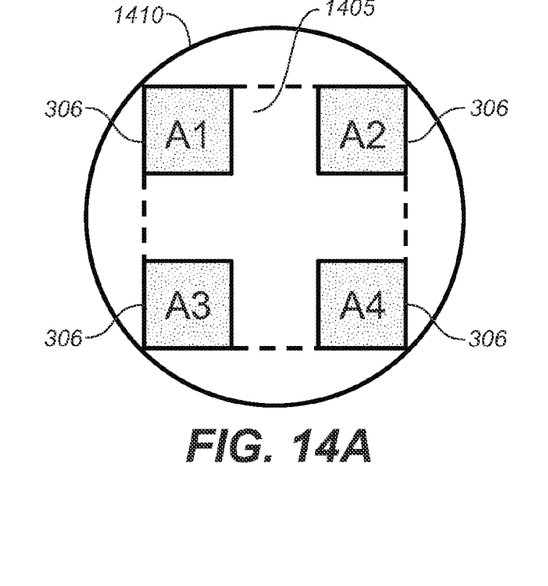
FIG. 14A depicts an embodiment of a group of four modulator panels with a 4:1 correspondence between controllable modulators and optical elements.
Figure 14B:
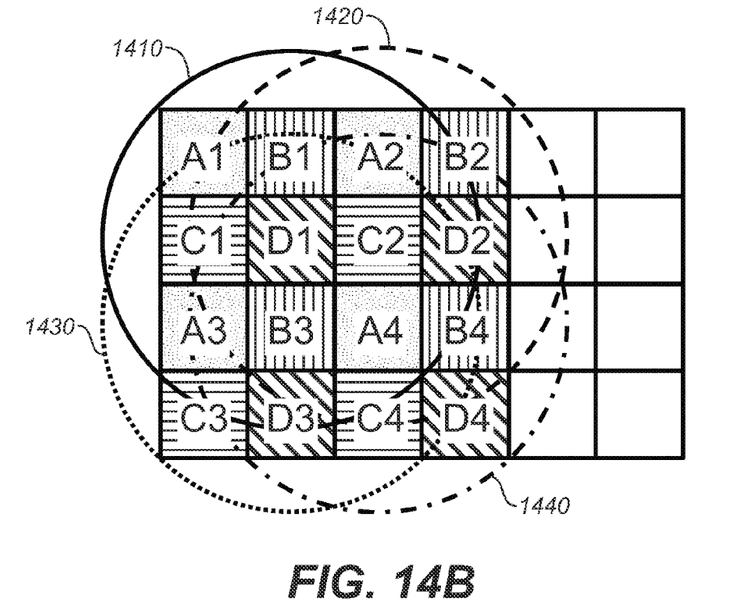
FIG. 14B depicts an embodiment of tiling such groups of controllable modulators to form a complete image in a multi-segment imager.

In certain embodiments, the physical characteristics of the modulators (such as LCDs, DLP chips or other MEMs devices) may force imaging gaps in the projected image. In such cases, one may tile the modulators in such a way so that overlapping images from multiple groups of modulators form a complete image. An example of such an embodiment is depicted in FIGS. 14A and 14B. FIG. 14A depicts an example arrangement for a group of four modulators (A1 to A4). The whole group may be projected through a single projection lens (1410) to form an image with image gaps (1405).

FIG. 14B depicts part of a multi-segment imager that comprises four groups of modulators. Each modulator may correspond to a single segment (304) or a group of segments. Group A comprises modulators A1-A4. Group B comprises modulator B1-B4. Group C comprises modulators C1-C4, and group D comprises modulators D1-D4. Each one of these groups of modulators is then projected onto a screen through a single projection lens (e.g., 308). For example, group A is projected using projection lens 1410 and group B is projected using projection lens 1420. As depicted in FIG. 14B, despite the gaps in-between the modulators of each group, a full image may be created by overlapping the images projected by each group. As depicted in FIG. 14B, imaging gaps (e.g., B1 and B3) in group A using projection lens 1410 may be filled by superimposing imaging from group B using projection lens 1420. Thus, a full image may be generated by superimposing images from all four groups. Similar or alternative tiling configurations may be repeated for all segments of the imaging array. For example, in some embodiments, similar tiling may be employed with R, G, B segments overlaid in the same fashion through monochrome modulators and projection lenses, or, alternatively, with white segments through color modulators and projection lenses. The tile shapes could be square, rectangular, hexagonal, or another shape so long as the overlap results in a complete image without gaps between segments.

Polarized Light Re-capture

In any of the aforementioned embodiments described herein, it may be desired to design a segment that increases the luminous efficiency of the individual emitters. As is known, light from an LED emitter may emit light comprising different polarization states in an uncollimated fashion.

Figure 13A:
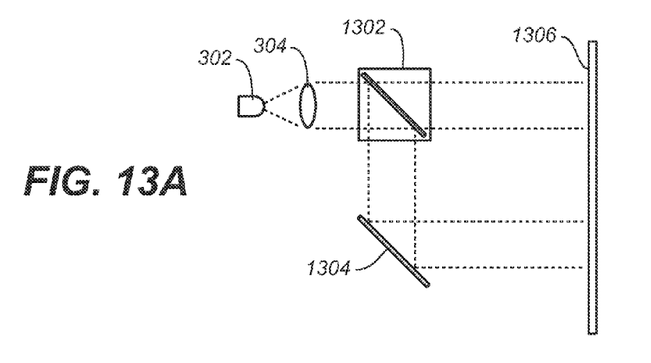
FIGS. 13A and 13B show two possible embodiments of a polarization re-capture element.

FIGS. 13A and 13B are different embodiments of a polarization re-capture element that may be utilized in the design of the present imaging system. As shown in FIG. 13A, light from emitter 302 may be guided by first optical element 304 to illuminate a polarizing beam splitter 1302. A first beam of light may transmit through to modulator 1306 with a given polarization—while a second beam part may be reflected (or otherwise redirected) to a mirrored surface 1304 that may in part the same polarization to the second beam as the first beam. Thereafter, the second beam may be deflected from surface 1304 to modulator 1306—with the same polarization and collimated—thus, re-capturing light from the emitter that may not have been useful for illuminating an image on a projection screen.

Figure 13B:
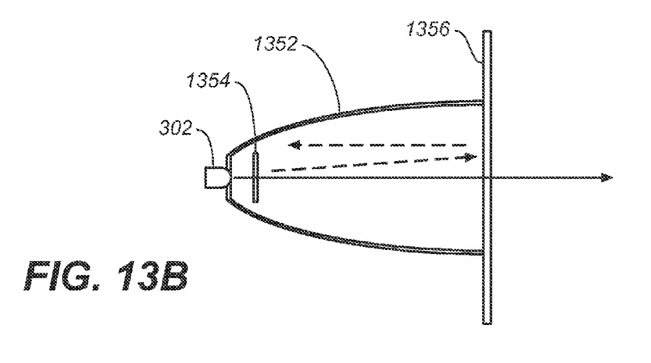

FIG. 13B is yet another possible polarizing re-capture element that may also be possible for the present system. Light from emitter 302 may illuminate a first polarizer reflector 1356—which preferentially passes a given polarity of light, while reflecting back light which is not so polarized within cavity 1352. The light within the cavity may reflect off of 1352 and surface 1354 until such time as the light returning to the first polarizer reflector 1356 has the preferential polarization, and is then transmitted through 1356.

It will be appreciated that the present systems of projection may be designed to affect 3D projection images as well. In merely one embodiment, if may be possible to duplicate the number of modulator panels and illuminate the projection screen in a manner conducive to affecting 3D images. In addition, all known manners of producing 3D images may be affected with the design of the present system—to include, but not limited to, spectral separation, polarization methods or the like.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:

1. A projection system comprising:
    a plurality of controllable emitters, said controllable emitters capable of being locally dimmed according to control signals, each said emitter providing light for a light path;
    a plurality of first optical elements, each said first optical element receiving light from one of said emitters;
    one or more controllable modulators receiving light from said plurality of first optical elements; a plurality of conduits, each said conduit disposed over a portion of said one or more controllable modulators;
    a plurality of second optical elements, each of said second optical elements receiving light from at least one of said plurality of conduits;
    a controller, said controller sending control signals to said controllable emitters and said one or more controllable modulators, said control signals applied according to image data to be rendered upon a screen by projected light from said plurality of second optical elements; and
    further wherein said one or more controllable modulators are disposed to transmit light to affect a plurality of overlapping areas of illumination upon a projection screen; and
    wherein said one or more controllable modulators are organized into groups, and further wherein a group of said groups of controllable modulators provides illumination for one of said second optical elements; and
    wherein illumination from the group of said groups of controllable modulators generates a projected image with imaging gaps.

2. The projection system of claim 1 wherein said controllable emitters comprises one of a group, said group comprising: LED, OLED and quantum dots.

3. The projection system of claim 2 wherein said first optical elements comprise one or more of a group, said group comprising: lens, collimating lens, condenser and polarizing re-capture elements.

4. The projection system of claim 3 wherein said one or more controllable modulators comprise one or more of a group, the group comprising: LCD panel, DLP (Digital Light Processing) integrated circuit, and micro-electro-mechanical device (MEM).

5. The projector system of claim 1 wherein said one or more controllable modulators are disposed to transmit light fanning inward to illuminate said projection screen.

6. The projection system of claim 1 wherein said one or more controllable modulators are disposed to transmit light fanning outward to illuminate said projection screen.

7. The projector system of claim 1 wherein each of said plurality of overlapping areas of illumination comprise one of a group, said group comprising: substantially circular areas of illumination and substantially rectangular areas of illumination.

8. The projection system of claim 7 wherein said plurality of overlapping areas of illumination comprising one of a group, said group comprising:
    substantially rectangular array pattern of areas of illumination and substantially hexagonal array pattern of areas of illumination.

9. The projection system of claim 1 wherein said projection system further comprises:
    a second set of one or more controllable modulators, said second set of one or more controllable modulators disposed to receive light from said one or more controllable modulators, said second set of one or more controllable modulator receiving control signals from said controller; and
    further wherein each of said conduit is disposed over a portion of said second set of one or more controllable modulators.

10. The projection system of claim 1 wherein said one or more controllable modulators comprise an array of controllable modulators and further wherein each said controllable modulator provides illumination for one of said second optical elements.

11. The projection system of claim 1 wherein said one or more controllable modulators comprise an array of controllable modulators and further wherein each said controllable modulator provides illumination for two of said second optical elements.

12. The projection system of claim 1, wherein said second optical element comprises a projector lens.

13. The projection system of claim 1, wherein illuminations from said second optical elements to the projection screen overlap to generate a final projected image with no imaging gaps.

* * * * *